(12) United States Patent
Wong (10) Patent No.: US 11,496,032 B2
(45) Date of Patent: Nov. 8, 2022

(54) VIBRATION-PROOF MAGLEV POWER GENERATOR

(71) Applicant: Shou-Cheng Wong, Kaohsiung (TW)

(72) Inventor: Shou-Cheng Wong, Kaohsiung (TW)

( * ) Notice: Subject to any disclaimer, the term of this patent is extended or adjusted under 35 U.S.C. 154(b) by 345 days.

(21) Appl. No.: 16/910,777

(22) Filed: Jun. 24, 2020

(65) Prior Publication Data
US 2021/0408883 A1 Dec. 30, 2021

(51) Int. Cl.
*H02K 21/24* (2006.01)
*H02N 15/00* (2006.01)

(52) U.S. Cl.
CPC ............ *H02K 21/24* (2013.01); *H02N 15/00* (2013.01)

(58) Field of Classification Search
CPC ............................... H02K 21/24; H02N 15/00
See application file for complete search history.

(56) References Cited

U.S. PATENT DOCUMENTS

| | | | | |
|---|---|---|---|---|
| 10,305,348 B2 * | 5/2019 | Wong | ................ | F16C 32/0421 |
| 10,367,405 B2 * | 7/2019 | Wong | ................ | F16C 32/0436 |
| 10,424,993 B2 * | 9/2019 | Wong | ................ | H02K 1/2793 |
| 10,797,578 B2 * | 10/2020 | Wong | ................ | H02K 7/1807 |
| 10,886,826 B2 * | 1/2021 | Wong | ................ | H02K 21/24 |
| 2019/0245423 A1 * | 8/2019 | Wong | ................ | H02K 7/1807 |

* cited by examiner

*Primary Examiner* — Bernard Rojas
(74) *Attorney, Agent, or Firm* — Muncy, Geissler, Olds & Lowe, P.C.

(57) ABSTRACT

A maglev power generator has a frame, a transmitting shaft, two electricity generating sets, two axial vibration-proof sets, two maglev assemblies, and two radial vibration-proof sets. The transmitting shaft longitudinally extends within the frame. The two electricity generating sets, the two maglev assemblies, and the two radial vibration-proof sets are connected to the transmitting shaft. Each axial vibration-proof set contacts a respective end of the transmitting shaft. The transmitting shaft suspends within the frame and is able to rotate without contact with the frame. The axial vibration-proof sets, the maglev assemblies, and the radial vibration-proof sets provide the transmitting shaft with magnetic forces radially and axially to prevent the rotating transmitting shaft from deviation. Therefore, the transmitting shaft is able to rotate with minimum power loss. The axial vibration-proof sets and the radial vibration-proof sets effectively offer a good vibration-proof function to let the transmitting shaft rotate stably.

20 Claims, 9 Drawing Sheets

VIBRATION-PROOF MAGLEV POWER GENERATOR

BACKGROUND OF THE INVENTION

1. Field of the Invention

The present invention relates to a power generating apparatus, and more particularly to a maglev power generator with a vibration-proof function.

2. Description of Related Art

A conventional electric generator has an electric generating set and a transmission mechanism. Mechanical energy provided by a power source is transmitted to the electric generating set via the transmission mechanism. The electric generating set converts the mechanical energy into electrical energy. Then, the electrical energy is outputted or stored by the electric generating set. However, the transmission mechanism has a rotatable shaft. When the shaft rotates, it causes friction that consumes mechanical power and decreases rotational stability of the shaft.

To solve the problem of power loss due to the friction, many kinds of maglev power generators are provided. Each of the maglev power generators has a maglev transmission mechanism for reducing friction or vibration when the mechanical power is transmitted. Nevertheless, the maglev transmission mechanism still vibrates in an axial direction or a radial direction when the maglev transmission mechanism rotates. In order to enhance rotational stability of the maglev transmission mechanism, improvements of the maglev power generators are necessary.

SUMMARY OF THE INVENTION

The main objective of the present invention is to provide a maglev power generator that reduces power loss due to friction and vibration when operating.

The maglev power generator has a frame, a transmitting shaft, two electricity generating sets, two axial vibration-proof sets, two maglev assemblies, and two radial vibration-proof sets. The transmitting shaft longitudinally extends within the frame. The two electricity generating sets, the two maglev assemblies, and the two radial vibration-proof sets are connected to the transmitting shaft. Each axial vibration-proof set contacts a respective end of the transmitting shaft. The transmitting shaft suspends within the frame and is able to rotate without contact with the frame. The axial vibration-proof sets, the maglev assemblies, and the radial vibration-proof sets provide the transmitting shaft with magnetic forces radially and axially to prevent the rotating transmitting shaft from deviation. Therefore, the transmitting shaft is able to rotate with minimum power loss. The axial vibration-proof sets and the radial vibration-proof sets effectively offer a good vibration-proof function to let the transmitting shaft rotate stably.

Other objects, advantages, and novel features of the invention will become more apparent from the following detailed description when taken in conjunction with the accompanying drawings.

DETAILED DESCRIPTION OF PREFERRED EMBODIMENTS

Figure 1:
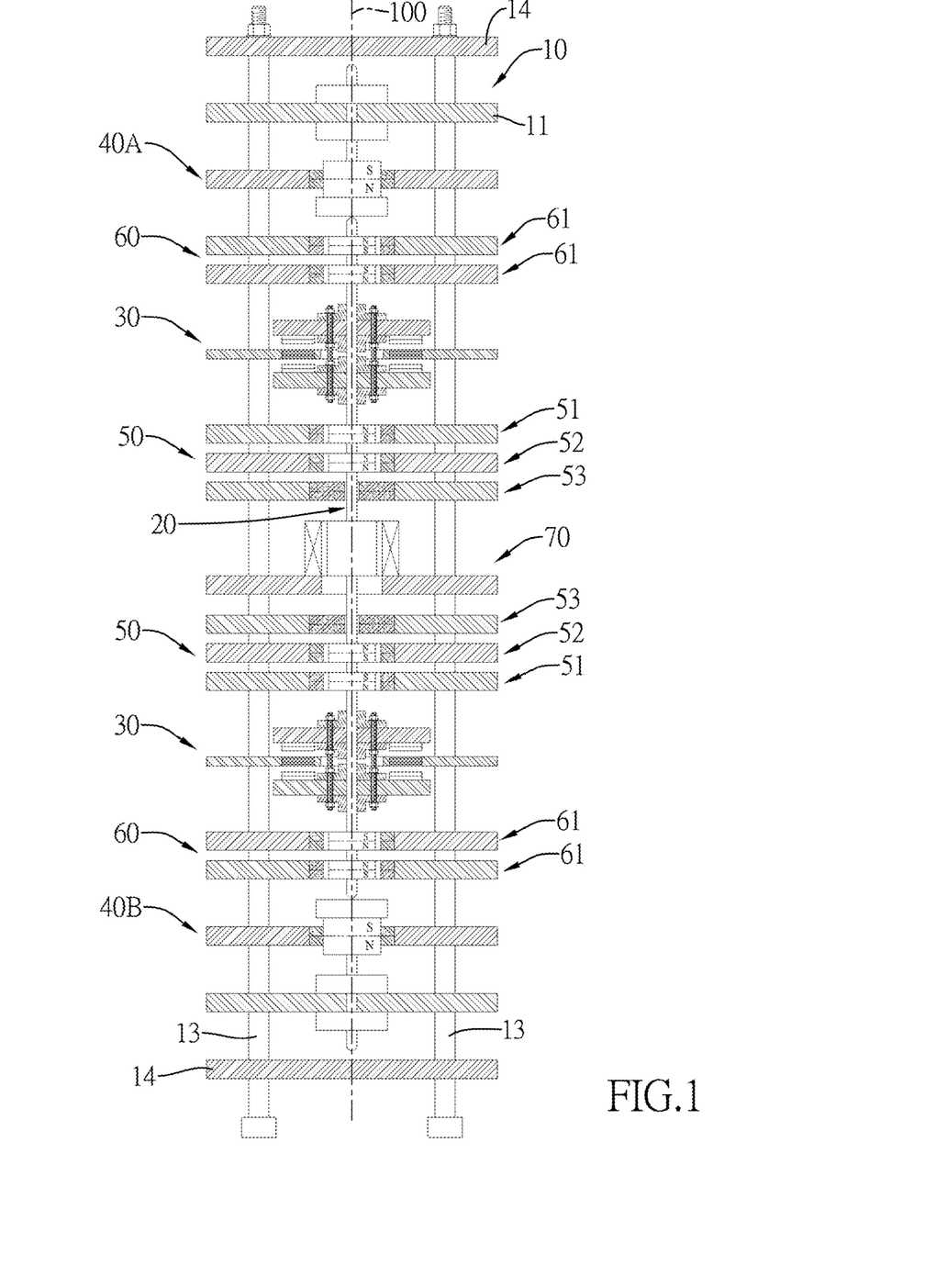
FIG. 1 is a side view of a schematic diagram of a first embodiment of a maglev power generator in accordance with the present invention.

With reference to FIG. 1, a first embodiment of a maglev power generator in accordance with the present invention has a frame 10, a transmitting shaft 20, and two generating modules. Each one of the two generating modules has an electricity generating set 30, an axial vibration-proof set 40A, 40B, a maglev assembly 50, and a radial vibration-proof set 60.

With reference to FIG. 1, the frame 10 has a central axis 100 extending longitudinally, an upper section, a lower section, two frame boards 11, 12, and multiple pillars 13. The central axis 100 extends from the top down. The upper section and the lower section are oppositely defined in the frame 10 and disposed along the central axis 100. The multiple pillars 13 are erect and parallel to the central axis 100. The two frame boards 11, 12 are respectively disposed in the upper section and the lower section and are mounted to the multiple pillars 13. An assembling space is defined between the two frame boards 11, 12.

With reference to FIG. 1, the frame 10 may further have two fastening boards 14. The two fastening boards 14 are respectively disposed in the upper section and the lower section and are mounted to the multiple pillars 13 to promote rigidity of the frame 10. The two frame boards 11, 12 are disposed between the two fastening boards 14.

Figure 5:
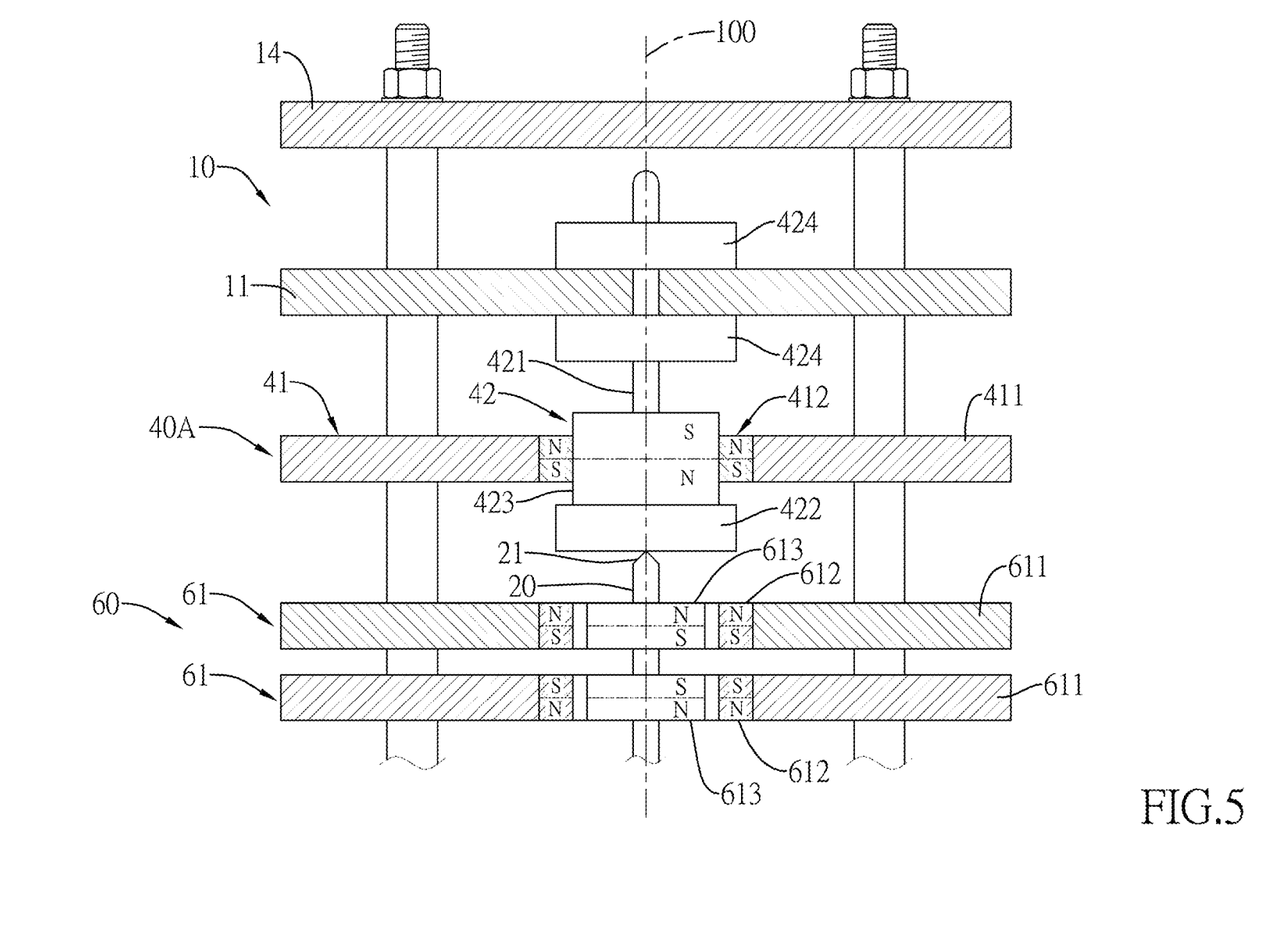
FIG. 5 is an enlarged side view of the maglev power generator in FIG. 1, showing an axial vibration-proof set and a radial vibration-proof set disposed in an upper section.
Figure 6:
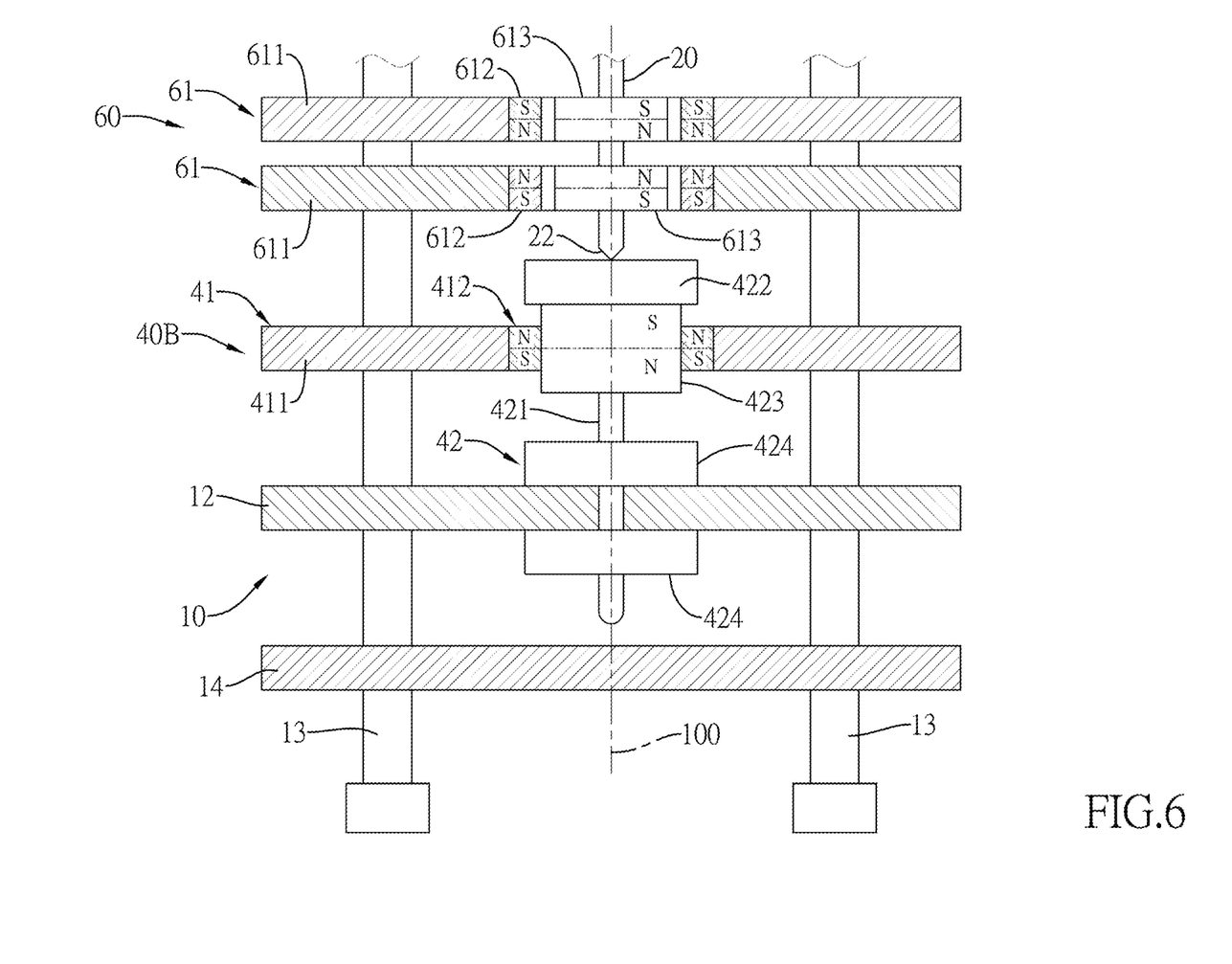
FIG. 6 is an enlarged side view of the maglev power generator in FIG. 1, showing another axial vibration-proof set and another radial vibration-proof set disposed in a lower section.

With reference to FIGS. 1, 5, and 6, the transmitting shaft 20 is disposed in the assembling space and is rotatable. The transmitting shaft 20 extends along the central axis 100, is mounted within the frame 10 without contact with the frame 10, and has two opposite ends 21, 22. Each end 21, 22 of the transmitting shaft 20 may be tapered or hemispherical.

The two generating modules have an up-down symmetry.

Figure 2:
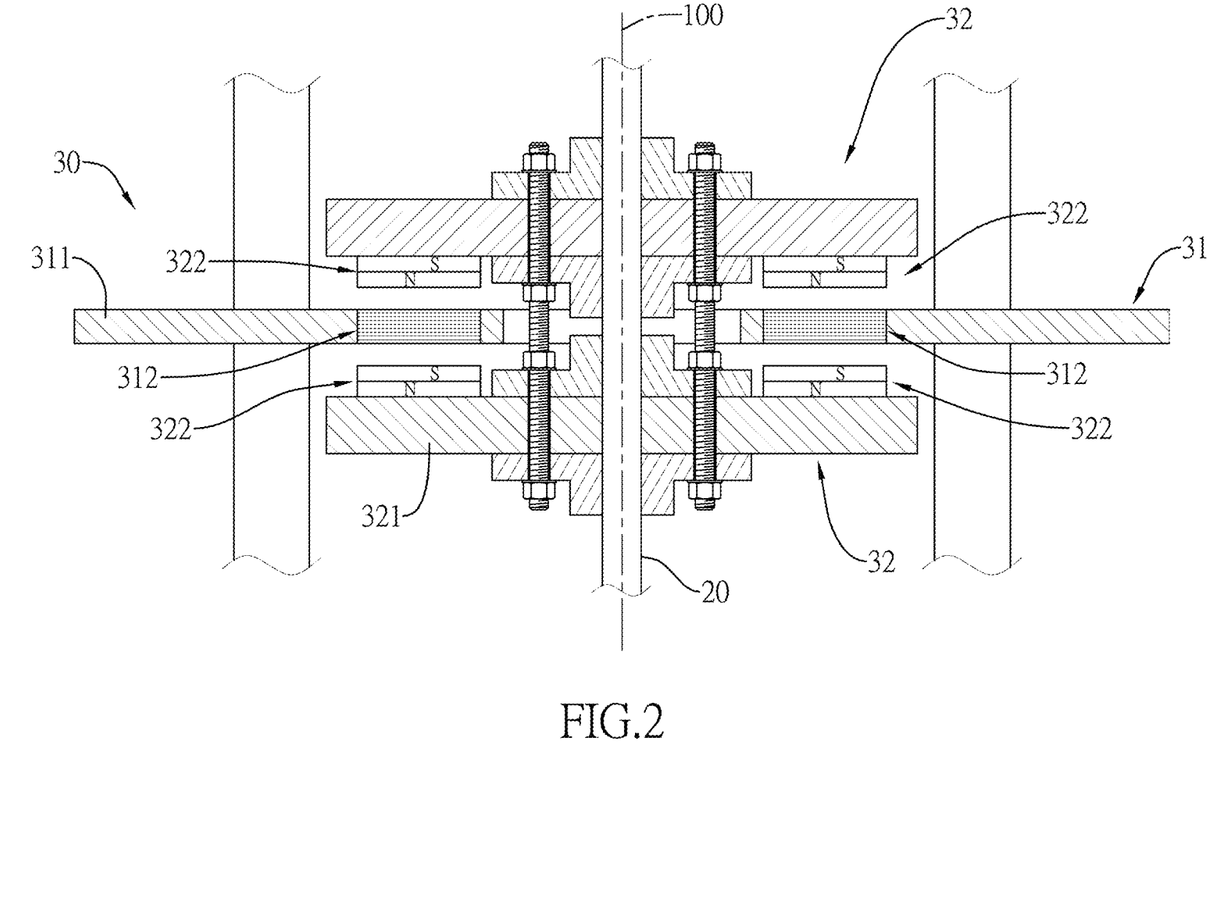
FIG. 2 is an enlarged side view of the maglev power generator in FIG. 1, showing an electricity generating set.
Figure 3:
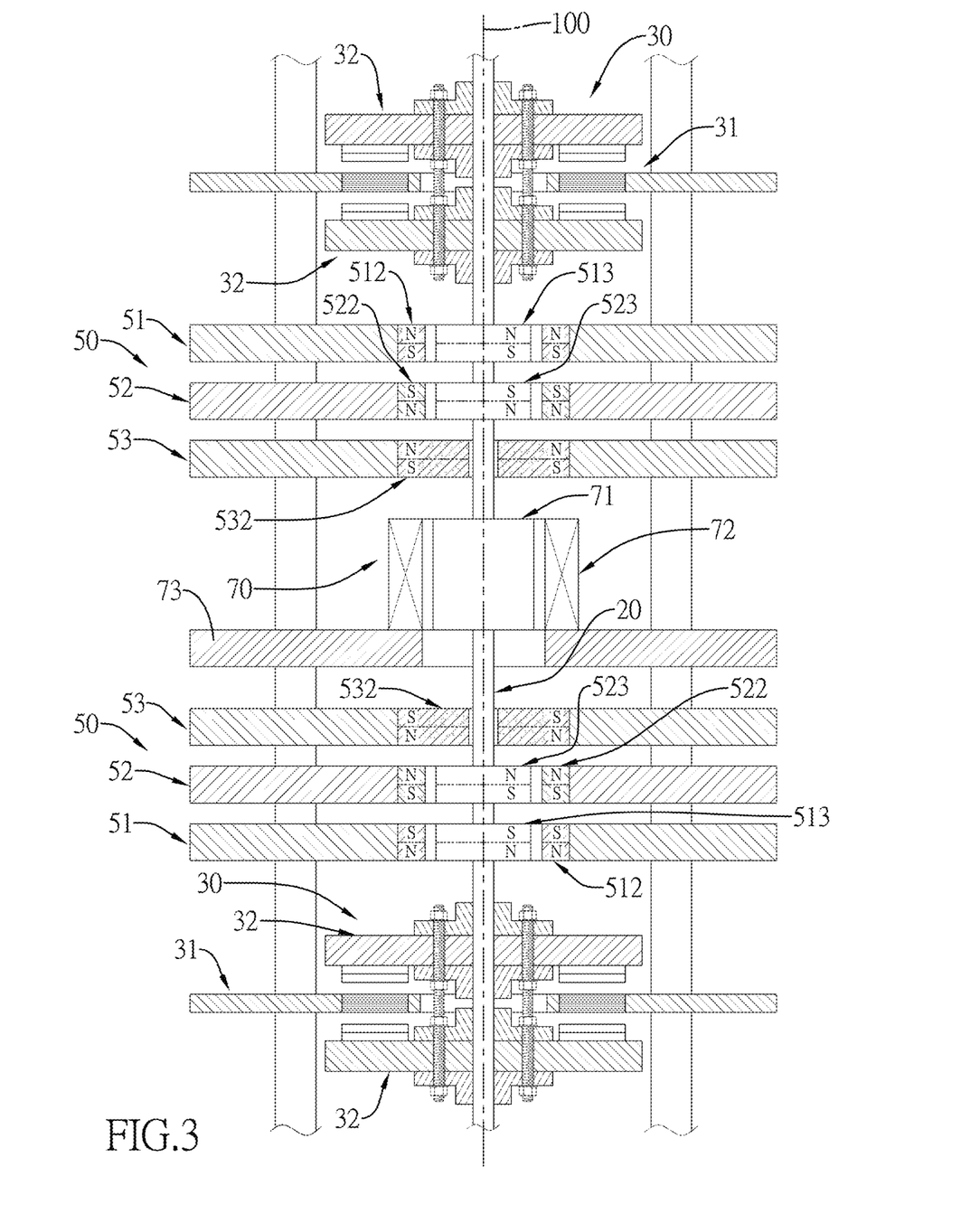
FIG. 3 is an enlarged side view of the maglev power generator in FIG. 1, showing two electricity generating sets, two maglev assemblies and a motor.

With reference to FIGS. 1 to 3, the two electricity generating sets 30 of the two generating modules are separately arranged along the central axis 100 and are respectively disposed in the upper section and the lower section. Each electricity generating set 30 has an electricity generating unit 31, two magnetic discs 32, and an air gap. The electricity unit 31 has a basal board 311 and multiple coils 312. The basal board 311 is stationary inside the frame 10 and has a central hole defined along the central axis 100. The transmitting shaft 20 is mounted through the central hole without contact with the basal board 31.

The multiple coils 312 surround the central hole, are arranged around the central axis 100 at equal angular intervals, and are apart from the central axis 100 by equal radial distances.

With reference to FIGS. 1 to 3, the two magnetic discs 32 are separately arranged along the central axis 100 and are symmetrical to each other in an up-down symmetry. Each magnetic disc 32 has a circular plate 321 and multiple magnets 322. The circular plate 321 is made of non-magnetic materials, is fixed to the transmitting shaft 20, and has an interior surface. The interior surface faces to the basal board 311. Each magnet 322 is permanently magnetic. The multiple magnets 322 are mounted to the interior surface of the circular plate 321 and arranged around the central axis 100 at equal angular intervals. Each magnet 322 is apart from the central axis 100 by a radial distance equal to the radial distances defined between the central axis 100 and the multiple coils 312. The air gap is defined between the multiple coils 312 of the electricity generating unit 31 and the multiple magnets 322 of each magnetic disc 32.

A number of the coils 312 is larger than a number of the magnets 322. The number of the coils 312 may be double of the number of the magnets 322. In order to make the electricity unit 31 generate large currents, each coil 312 may be a pancake coil made of a flat cooper wire.

With reference to FIGS. 1, 5, and 6, the two axial vibration-proof sets 40A, 40B of the two generating modules are respectively mounted in the upper section and the lower section. The two axial vibration-proof sets 40A, 40B have an up-down symmetry. Each axial vibration-proof set 40A, 40B has a magnetic vibration-proof assembly 41 and a magnetic post 42. The magnetic vibration-proof assembly 41 has a fixed board 411 and a magnetic hoop 412. The fixed board 411 is stationary. The magnetic hoop 412 is mounted within the fixed board 411 and surrounds the central axis 100.

With reference to FIGS. 1, 5, and 6, the magnetic post 42 is disposed along the central axis 100, is mounted through the magnetic hoop 412, is able to move along the central axis 100 within a limited distance, is radially attractive to the magnetic hoop 412, and is mounted through a respective frame board 11, 12. The magnetic post 42 has a post body 421, an abutting part 422, a magnetic part 423, and two restricting parts 424. The post body 421 has two opposite ends. The abutting part 422 is disposed at one of the two opposite ends of the post body 421 and is in point contact with a corresponding one of the two opposite ends of the transmitting shaft 20. The magnetic part 423 is radially attractive to the magnetic hoop 412, is mounted to the post body 421, adjoins the abutting part 422, and is mounted through the magnetic hoop 412. The magnetic part 423 is subjected to magnetic force provided by the magnetic hoop 412 and is moveable within the magnetic hoop 412 along the central axis 100. The two restricting parts 424 are separately fixed to the post body 421 and disposed adjacent to one of the two opposite ends of the post body 421 that is opposite to the abutting part 422. A corresponding one of the two frame boards 11, 12 of the axial vibration-proof set 40A, 40B is disposed between the two restricting parts 424 and apart from the two restricting parts 412. A gap defined between the respective frame board 11, 12 and each restricting part 412 is determined according to practical situations.

With reference to FIGS. 1, 5, and 6, the magnetic part 423 can only move within the magnetic hoop 412 along the central axis 100. The radial attraction between the magnetic part 423 and the magnetic hoop 412 makes the magnetic part 423 longitudinally move within a limited distance. In the first embodiment, the gap defined between a respective frame board 11, 12 and each restricting part 412 is small. Therefore, the magnetic part 423 can only move along the central axis 100 within a limited distance.

With reference to FIGS. 1, 5, and 6, the abutting part 422 of the magnetic post 42 of the axial vibration-proof set 40A disposed in the upper section is oriented toward the lower section. The abutting part 422 of the magnetic post 42 of the axial vibration-proof set 40B disposed in the lower section is oriented toward the upper section. With reference to FIG. 5, the north pole of the magnetic part 423 and the north pole of the magnetic hoop 412 are oriented toward opposite directions. Therefore, the magnetic part 423 and the magnetic hoop 412 are longitudinally attractive.

Figure 4:
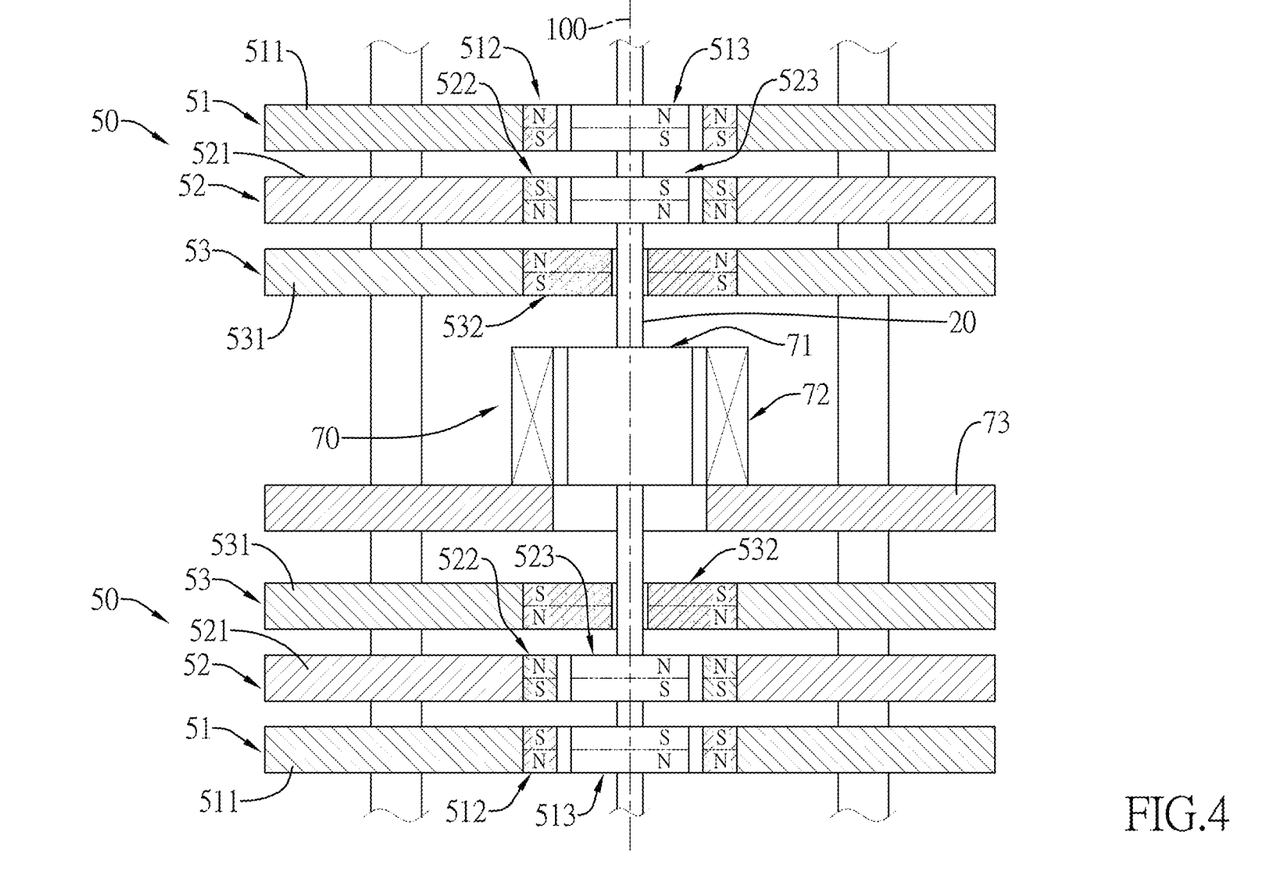
FIG. 4 is an enlarged side view of the maglev power generator in FIG. 1, showing two maglev assemblies and a motor.

With reference to FIGS. 1, 3, and 4, the two maglev assemblies 50 of the two generating modules are respectively disposed in the upper section and the loser section. The two maglev assemblies 50 have an up-down symmetry. With reference to FIG. 3, the two maglev assemblies 50 are disposed between the two electricity generating units 30 and separately arranged along the central axis 100. Amount of the maglev assemblies 50 may be adjusted according to practical circumstances.

With reference to FIGS. 1, 3, and 4, the maglev assembly 50 of each generating module has two first radial magnetic units 51, 52 and an axial magnetic unit 53. The two magnetic units 51, 52 are separately arranged along the central axis 100. Each first radial magnetic unit 51, 52 has a circular board 511, 521, a first magnetic ring 512, 522, and a first centric magnet 513, 523. The circular board 511, 521 is stationary. The first magnetic ring 512, 522 is permanently magnetic, has a circular outline, and is mounted within and attached to the circular board 511, 521. The centric magnet 513, 523 is a round block with permanent magnetism and is coaxially fixed to the transmitting shaft 20. The first magnetic ring 512, 522 surrounds the first centric magnet 513, 523 about the central axis 100 and is apart from the first centric magnet 513, 523 by an annular air gap. The first magnetic ring 512, 522 and the first centric magnet 513, 523 are radially repellent and provide a radial vibration-proof function via the radial repellent force.

With reference to FIGS. 1, 3, and 4, the axial magnetic unit 53 is arranged along the central axis 100 apart from an adjacent one of the two first radial magnetic units 51, 52, and has a connecting board 531 and a magnetic component 532. The connecting board 531 is stationary. The magnetic component 532 has an axial hole, is permanently magnetic, is mounted within and attached to the connecting board 531, and is mounted around the transmitting shaft 20. The magnetic component 532 and the first magnetic ring 512, 522 and the first centric magnet 513, 523 of an adjacent one of the two first radial magnetic units 51, 52 are longitudinally repellent. An air gap is defined between the magnetic component 532 of the axial magnetic unit 53 and the first centric magnet 513, 523 and the first magnetic ring 512, 522 of the adjacent one of the two first radial magnetic units 51, 52.

With reference to FIGS. 1, 3, and 4, north pole and south pole of the first centric magnet 513, 523 of the first radial magnetic unit 51, 52 of the maglev assembly 50 of each one of the two generating modules are arranged along the central axis 100. North pole and south pole of the first magnetic ring 512, 522 of the first radial magnetic unit 51, 52 of the maglev assembly 50 of each one of the two generating modules are arranged along the central axis 100. The first centric magnets 513, 523 of the two first radial magnetic units 51, 52 of the maglev assembly 50 of each one of the two generating modules are repellent along the central axis 100. The first magnetic rings 512, 522 of the two first radial magnetic units 51, 52 of the maglev assembly 50 of each one of the two generating modules are repellent along the central axis 100. And the first magnetic ring 512, 522 and the first centric magnet 513, 523 are radially repellent to provide a radial vibration-proof function via radial repellent force.

With reference to FIGS. 1, 3, and 4, in the first embodiment, the first centric magnets 513, 523 of the two first radial magnetic units 51, 52 of the maglev assembly 50 of each one of the two generating modules are longitudinally repellent.

Therefore, the transmitting shaft 20 suspends within the frame 10 by the maglev assemblies 50 of the two generating modules. The maglev assembly 50 of each generating module provides the transmitting shaft 20 both radially vibration-proof and longitudinally vibration-proof functions via radially and longitudinally repellent forces.

With reference to FIGS. 1, 3, and 4, taking the maglev assembly 50 disposed in the upper section as an example, the north poles of the first centric magnet 513 and the first magnetic ring 512 are oriented toward a top of the frame 10. The south poles of the first magnet 513 and the first magnetic ring 512 are oriented toward a bottom of the frame 10. The north poles of the first centric magnet 523 and the first magnetic ring 522 are oriented toward the bottom of the frame 10. The south poles of the first magnet 513 and the first magnetic ring 512 are oriented toward the top of the frame 10.

Therefore, the first magnets 513, 523 provide longitudinally repellent forces, and the first magnetic rings 512, 522 provide longitudinally repellent forces as well. North pole and south pole of the magnetic component 532 of the axial magnetic unit 53 are respectively oriented toward the top and the bottom of the frame 10. Therefore, the magnetic component 532 of the axial magnetic unit 53 and the first centric magnet 523 of an adjacent one of the two first radial magnetic units 52 are longitudinally repellent. The axial magnetic unit 53 is able to provide the transmitting shaft 20 with a longitudinally vibration-proof function accordingly. The maglev assembly 50 disposed in the lower section and the maglev assembly 50 disposed in the upper section have an up-down symmetry. In the same way, the maglev assembly 50 disposed in the lower section provides a same vibration-proof function as the maglev assembly 50 disposed in the upper section.

With reference to FIGS. 1, 5, and 6, the two radial vibration-proof sets 60 of the two generating modules are respectively disposed in the upper section and the lower section. Preferably, the two radial vibration-proof sets 60 have an up-down symmetry. In the first embodiment, the radial vibration-proof set 60 disposed in the upper section is arranged between the axial vibration-proof set 40A and the electricity generating set 30 disposed in the upper section. The radial vibration-proof set 60 disposed in the lower section is arranged between the axial vibration-proof set 40B and the electricity generating set 30 disposed in the lower section.

With reference to FIGS. 1, 5, and 6, each radial vibration-proof set 60 has at least one second radial magnetic unit 61, and amount of the second radial magnetic unit 61 being determined according to practical requirements. Each second radial magnetic unit 61 has a positioning board 611, a second magnetic ring 612, and a second centric magnet 613. The positioning board 611 is stationary. The second centric magnet 613 is a permanently magnetic round block and is coaxially fixed to the transmitting shaft 20. The second magnetic ring 612 is permanently magnetic and is circular in shape. The second magnetic ring 612 is mounted within and attached to the positioning board 611, surrounds the second centric magnet 613 about the central axis 100, and is disposed apart from the second centric magnet 613 by an annular air gap.

With reference to FIGS. 1, 5, and 6, north pole and south pole of the second centric magnet 613 are respectively oriented toward the two opposite ends of the transmitting shaft 20. North pole and south pole of the second magnetic ring 612 are respectively oriented toward the two opposite ends of the transmitting shaft 20. The second centric magnet 613 and the second magnetic ring 612 are radially repellent accordingly and are able to provide the transmitting shaft 20 with a radial vibration-proof function.

With reference to FIGS. 1, 5, and 6, the at least one second radial magnetic unit 61 includes two second radial magnetic units 61. The two second radial magnetic units 61 are separately arranged along the central axis 100. North poles of the second centric magnets 613 of the two second magnetic units 61 are oriented toward opposite directions. North poles of the second magnetic rings 612 of the two second magnetic units 61 are oriented toward opposite directions.

With reference to FIGS. 1, 5, and 6, the second centric magnet 613 and the second magnetic ring 612 of each second magnetic unit 61 are radially repellent and provide the transmitting shaft 20 with a radial vibration-proof function. The two second magnetic units 61 are longitudinally repellent and provide the transmitting shaft 20 with a longitudinal vibration-proof function.

With reference to FIGS. 1, 3, and 4, in the first embodiment, the maglev power generator in accordance with the present invention further has a motor 70. The motor 70 is mounted within the frame 10, is connected to the transmitting shaft 20, and provides the transmitting shaft 20 with an auxiliary driving force to drive the transmitting shaft 20 in an appropriate timing. The motor 70 is disposed between the two maglev assemblies 50 of the two generating modules to keep the transmitting shaft 20 stably rotating.

With reference to FIGS. 1, 3, and 4, the motor 70 has a rotor 71 and a winding 72. The rotor 71 is fixed to the transmitting shaft 20. The winding 72 is securely mounted to a stationary carrying board 73 and is mounted around the rotor 71. An annular air gap is defined between the rotor 71 and the winding 72. In the first embodiment, the rotor 71 is made of non-magnetic materials such as aluminum to promote driving efficiency of the motor 70.

Figure 7:
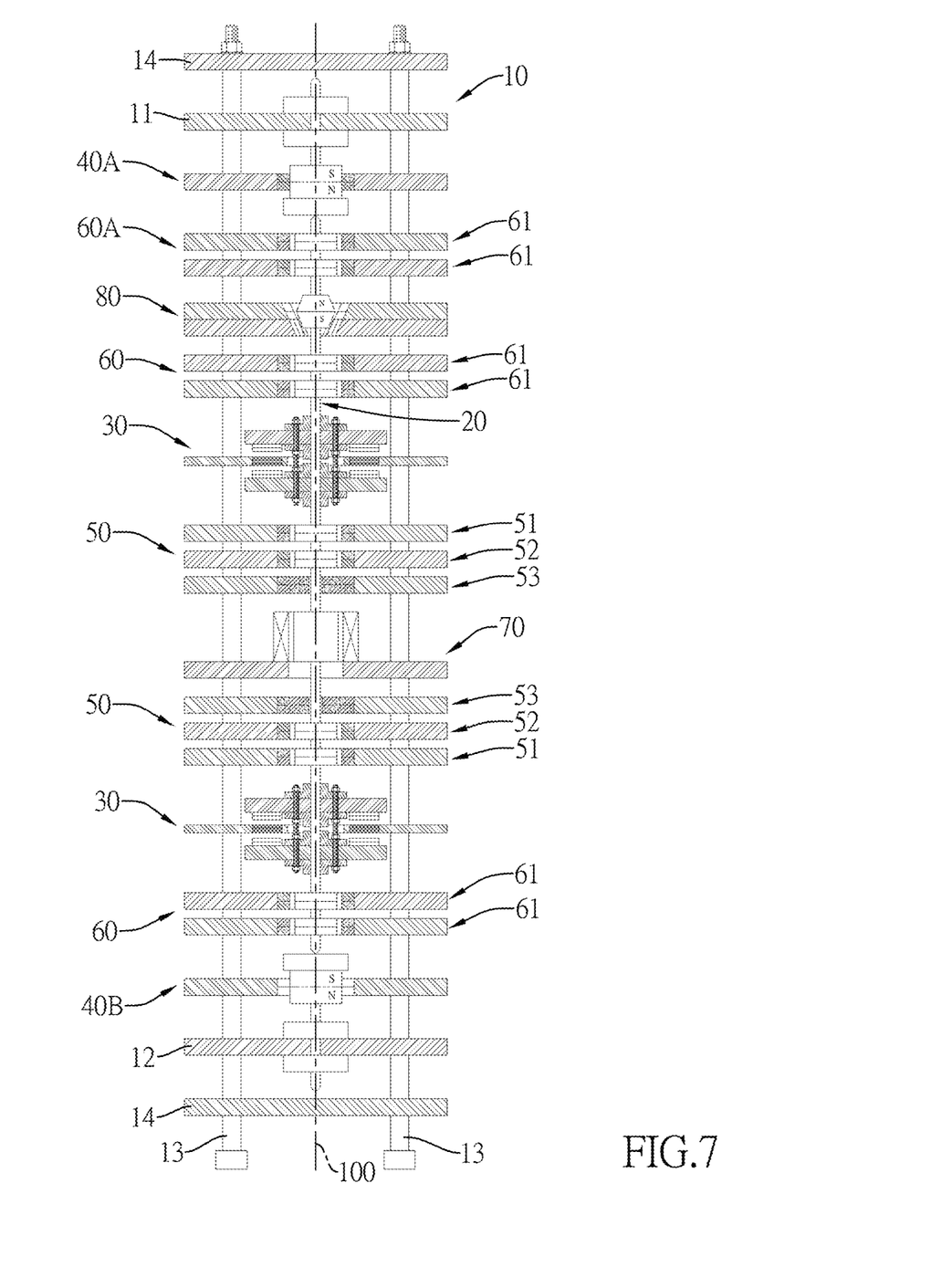
FIG. 7 is a side view of a schematic diagram of a second embodiment of a maglev power generator in accordance with the present invention.

With reference to FIG. 7, a second embodiment of the maglev power generator in accordance with the present invention further has a supplementary radial vibration-proof set 60A and a magnetic lifting set 80. The supplementary radial vibration-proof set 60A is identical to the radial vibration-proof set 60 of one of the two generating modules that is disposed in the lower section. The magnetic lifting set 80 is disposed within the frame 10 and is connected to the transmitting shaft 20. The magnetic lifting set 80 provides the transmitting shaft 20 with an auxiliary magnetic force to facilitate suspension of the transmitting shaft 20. Position of the magnetic lifting set 80 may be adjusted according to practical operating circumstances. In the second embodiment, the magnetic lifting set 80 is disposed in the upper section, between the supplementary radial vibration-proof set 60A and the radial vibration-proof set 60 of the generating module disposed in the upper section, and adjacent to the axial vibration-proof set 40A. The magnetic lifting set 80 disposed between the two radial vibration-proof sets 60 and adjacent to the axial vibration-proof set 40A can promote rotation stability of the transmitting shaft 20.

Figure 8:
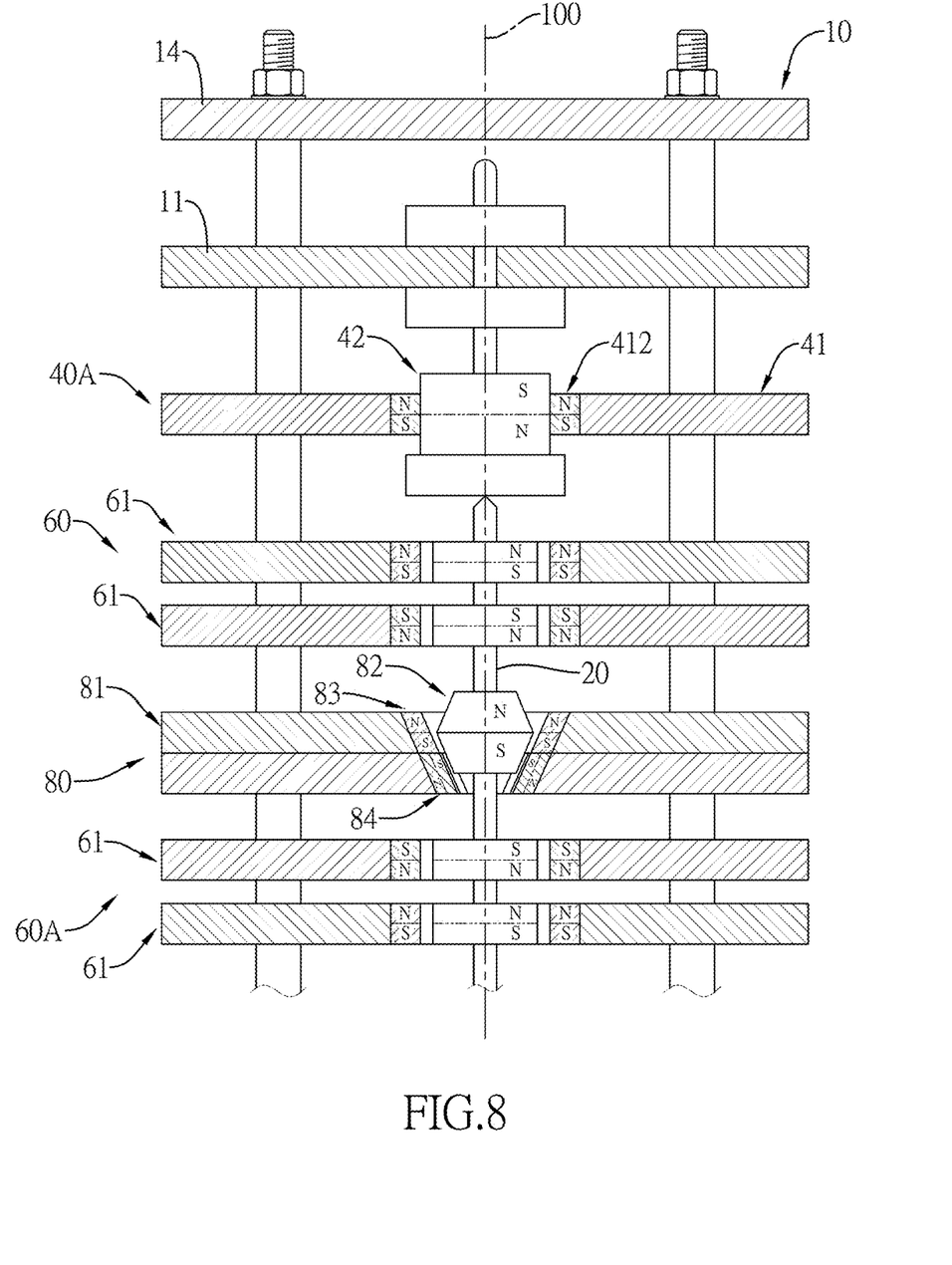
FIG. 8 is an enlarged side view of the maglev power generator in FIG. 7, showing an axial vibration-proof set, two radial vibration-proof sets and a magnetic lifting set disposed in an upper section.
Figure 9:
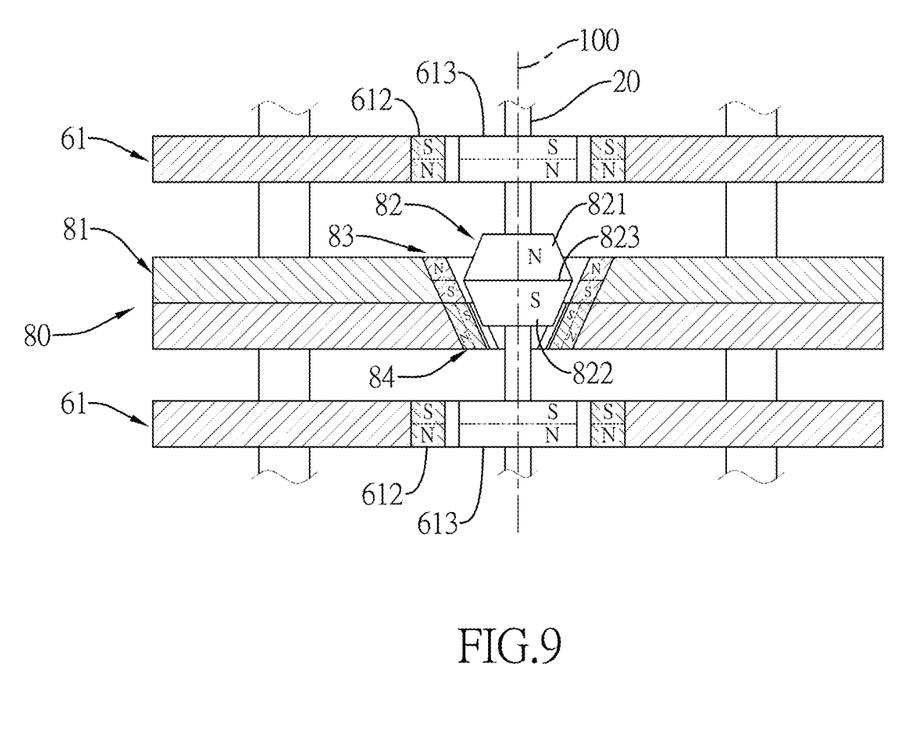
FIG. 9 is an enlarged side view of the maglev power generator in FIG. 7, showing the magnetic lifting set disposed between two radial vibration-proof sets.

With reference to FIGS. 7 to 9, the magnetic lifting set 80 has a board 81, an axial magnet 82, a first frustum ring 83, and a second frustum ring 84. The board 81 is stationary and may be a single plate or multiple plates piled together. The board 81 has a tapered hole 810 tapered off from the top down. The tapered hole 810 has a first tapered section 811 and a second tapered section 812 disposed below the first tapered section 811.

With reference to FIGS. 7 to 9, the first frustum ring 83 and the second frustum ring 84 are respectively disposed within the first tapered section 811 and the second tapered section 812.

With reference to FIGS. 7 to 9, the axial magnet 82 is permanently magnetic, is fixed to the transmitting shaft 20, and is surrounded by the first frustum ring 83 and the second frustum ring 84. The axial magnet 82 may be disposed within the first frustum ring 83 without contact with the first frustum ring 83. The axial magnet 82 may be disposed within the first frustum ring 83 and the second frustum ring 84 without contact with the first frustum ring 83 and the second frustum ring 84.

The axial magnet 82 has a first portion 821, a second portion 822, and a ridge 823. The first portion 821 and the second portion 822 are frustums. The first portion 821 and the second portion 822 have an up-down symmetry. The ridge 823 is disposed between the first portion 821 and the second portion 822.

The second portion 822 of the axial magnet 82 is oriented toward the first frustum ring 83 and the second frustum ring 84 and apart from the first frustum ring 83 and the second frustum ring 84. An air gap is defined between the second portion 822 and the first and second frustum ring 83, 84. The axial magnet 82 and the first and second frustum ring 83, 84 provide an auxiliary longitudinal force to support weight of the transmitting shaft 20 and mechanisms connected to the transmitting shaft 20. The axial magnet 82 and the first and second frustum rings 83, 84 make the transmitting shaft 20 suspend in the frame 10 and able to stably rotate.

With reference to FIGS. 8 and 9, each one of the first portion 821 and the second portion 822 has a cross-section. The cross-section of each one of the first portion 821 and the second portion 822 has two oblique edges. An acute angle is defined between the central axis 100 and each oblique edge. The range of the acute angle is greater or equal to 15 degrees and less than or equal to 75 degrees. Preferably, the acute angle may be 30, 45, or 60 degrees.

Each one of the first frustum ring 83 and the second frustum ring 84 has a cross-section. The cross-section of each one of the first frustum ring 83 and the second frustum ring 84 has two inner inclined edges. In the second embodiment, the two oblique edges are respectively parallel to the two inner inclined edges.

With reference to FIGS. 8 and 9, north pole and south pole of the first frustum ring 83 are longitudinally opposite. North pole and south pole of the second frustum ring 84 are radially opposite. A lower pole (south pole) of the first frustum ring 83 and an inner pole (south pole) of the second frustum ring 84 are repellent.

With reference to FIGS. 8 and 9, the first portion 821 is north pole, and the second portion 822 is south pole. An upper pole of the first frustum ring 83 is north pole, and the lower pole of the first frustum ring 83 is south pole. The inner pole of the second frustum ring 84 is south pole, and an outer pole of the second frustum ring 84 is north pole. The second portion 822 (south pole) of the axial magnet 82 and the lower pole (south pole) of the first frustum ring 84 are repellent. The first portion 821 (north pole) of the axial magnet 82 and the upper pole (north pole) of the first frustum ring 84 are repellent.

Moreover, north poles of the second centric magnet 613 and the second magnetic ring 612 of the second magnetic unit 61 of the radial vibration-proof set 60 disposed above the magnetic lifting set 80 are oriented toward the magnetic lifting set 80. South poles of the second centric magnet 613 and the second magnetic ring 612 of the second magnetic unit 61 of the radial vibration-proof set 60 disposed below the magnetic lifting set 80 are oriented toward the magnetic lifting set 80. Therefore, the two radial vibration-proof sets 60 and the magnetic lifting set 80 are longitudinally repellent and able to promote the longitudinal vibration-proof function.

With reference to FIGS. 1, 2, and 7, the transmitting shaft 20 may be connected to an outer driving device and driven by the outer driving device to rotate. The motor 70 may drive the transmitting shaft 20 in an appropriate timing. The motor 70 provides the transmitting shaft 20 with auxiliary power and is shut down when the transmitting shaft 20 rotates normally.

The axial vibration-proof sets 40A, 40B, the maglev assemblies 50, and the radial vibration-proof sets 60 provide the transmitting shaft 20 with longitudinal and radial vibration-proof functions. Therefore, the transmitting shaft 20 is able to rotate with minimum power loss. The vibration-proof functions provided by the axial vibration-proof sets 40A, 40B, the maglev assemblies 50, and the radial vibration-proof sets 60 prevent the transmitting shaft 20 from offset or deviation.

Furthermore, the axial vibration-proof sets 40A, 40B are respectively in point contact with the two opposite ends of the transmitting shaft 20, and the longitudinal attraction between the magnetic vibration-proof assembly 41 and the magnetic post 42 of each axial vibration-proof set 40A, 40B provides the transmitting shaft 20 with a good axial vibration-proof function and keeps the transmitting shaft 20 rotating stably.

Moreover, in the second embodiment, the magnetic lifting set 80 provides the auxiliary longitudinal force to support weight of the transmitting shaft 20 and mechanisms connected to the transmitting shaft 20. The magnetic lifting set 80 facilitates suspension of the transmitting shaft 20. The transmitting shaft 20 suspends within the frame 10 and rotates to drive the magnetic discs 32 to rotate relative to the electricity generating unit 31. The coils 312 of the electricity generating unit 31 generate electromotive forces and electrical currents accordingly. Therefore, the maglev power generator can effectively generate power.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A maglev power generator comprising:
   a frame having a central axis extending longitudinally;
an upper section and a lower section oppositely defined in the frame and disposed along the central axis; and
two frame boards respectively disposed in the upper section and the lower section;
a transmitting shaft extending along the central axis, being rotatable by magnetic levitation without contact with the frame, and having two opposite ends respectively oriented toward the upper section and the lower section;
two generating modules mounted within the frame, respectively disposed in the upper section and the lower section, being symmetrical to each other in an up-down symmetry, and each generating module having
an electricity generating set having
an electricity generating unit having
a basal board being stationary and mounted around the transmitting shaft without contact with the transmitting shaft; and
multiple coils arranged around the central axis at equal angular intervals and apart from the central axis by equal radial distances;
two magnetic discs respectively disposed above and below the electricity generating unit, being symmetrical to each other in an up-down symmetry, and each magnetic disc having
a circular plate fixed to the transmitting shaft and having
an interior surface facing to the basal board; and
multiple magnets mounted to the interior surface of the circular plate, arranged around the central axis at equal angular intervals, and each magnet being apart from the central axis by a radial distance equal to the radial distances defined between the central axis and the multiple coils; and
an air gap defined between the multiple coils of the electricity generating unit and the multiple magnets of each one of the two magnetic discs;
an axial vibration-proof set having
a magnetic vibration-proof assembly having
a fixed board being stationary; and
a magnetic hoop mounted within the fixed board; and
a magnetic post disposed along the central axis, mounted through the magnetic hoop, being moveable along the central axis within a limited distance, being attractive to the magnetic hoop, and being in point contact with a corresponding one of the two opposite ends of the transmitting shaft;
a maglev assembly having
two first radial magnetic units separately arranged along the central axis, and each first radial magnetic unit having
a circular board being stationary;
a first centric magnet with permanent magnetism being coaxially fixed to the transmitting shaft; and
a first magnetic ring with permanent magnetism being mounted within and attached to the circular board, surrounding the first centric magnet about the central axis, disposed apart from the first centric magnet by an annular air gap, and radially repelling the first centric magnet; and
an axial magnetic unit arranged along the central axis, apart from an adjacent one of the two first radial magnetic units, and having
a connecting board being stationary;
a magnetic component with permanent magnetism mounted within and attached to the connecting board, mounted around the transmitting shaft about the central axis, and longitudinally repelling the first centric magnet of the adjacent one of the two first radial magnetic units; and
an air gap defined between the magnetic component of the axial magnetic unit and the first centric magnet and the first magnetic ring of the adjacent one of the two first radial magnetic units; and
a radial vibration-proof set having
at least one second radial magnetic unit, each one of the at least one second radial magnetic unit having
a positioning board being stationary;
a second centric magnet with permanent magnetism being coaxially fixed to the transmitting shaft;
a second magnetic ring with permanent magnetism being mounted within and attached to the positioning board, surrounding the second centric magnet about the central axis, disposed apart from the second centric magnet by an annular air gap, and radially repelling the second centric magnet.

2. The maglev power generator as claimed in claim 1, wherein
the magnetic post of the axial vibration-proof set of each one of the two generating modules has
a post body having two opposite ends;
an abutting part disposed at one of the two opposite ends of the post body and contacting a corresponding one of the two opposite ends of the transmitting shaft;
a magnetic part being radially attractive to the magnetic hoop of the magnetic vibration-proof assembly of the axial vibration-proof set, mounted to the post body, adjoining the abutting part, mounted through the magnetic hoop, and being moveable within the magnetic hoop along the central axis; and
two restricting parts separately fixed to the post body and disposed adjacent to the other one of the two opposite ends of the post body; and
a corresponding one of the two frame boards is disposed between and apart from the two restricting parts of the magnetic post of the axial vibration-proof set.

3. The maglev power generator as claimed in claim 2, wherein
north pole and south pole of the first centric magnet of the first radial magnetic unit of the maglev assembly of each one of the two generating modules are arranged along the central axis;
north pole and south pole of the first magnetic ring of the first radial magnetic unit of the maglev assembly of each one of the two generating modules are arranged along the central axis;
the first centric magnets of the two first radial magnetic units of the maglev assembly of each one of the two generating modules are repellent along the central axis; and
the first magnetic rings of the two first radial magnetic units of the maglev assembly of each one of the two generating modules are repellent along the central axis.

4. The maglev power generator as claimed in claim 3, wherein the maglev power generator has a motor disposed between the two generating modules and having
a rotor fixed to the transmitting shaft;
a winding securely mounted in the frame via a carrying board being stationary and mounted around the rotor; and
an annular air gap is disposed between the rotor and the winding.

5. The maglev power generator as claimed in claim 4, wherein
the radial vibration-proof sets of the two generating modules are symmetrical to each other in an up-down symmetry;
the radial vibration-proof set of each one of the two generating modules is disposed between the electricity generating set and the axial vibration-proof set of the generating module;
the at least one second radial magnetic unit of the radial vibration-proof set of each one of the two generating modules includes two second radial magnetic units separately arranged along the central axis;
north poles of the second centric magnets of the two second radial magnetic units are oriented toward opposite directions; and
north poles of the second magnetic rings of the two second radial magnetic units are oriented toward opposite directions.

6. The maglev power generator as claimed in claim 4, wherein the maglev power generator has a magnetic lifting set mounted within the frame and having
a board being stationary and having
a tapered hole extending along the central axis, tapered off from the top down, and having
a first tapered section; and
a second tapered section disposed below the first tapered section; and
a first frustum ring disposed within the first tapered section; and
a second frustum ring disposed within the second tapered section; and
an axial magnet fixed to the transmitting shaft, surrounded by the first frustum and the second frustum, and having
a first portion being a frustum; and
a second portion being a frustum that is symmetrical to the first portion in an up-down symmetry, being able to be fit in the first frustum ring and the second frustum ring, and being repellent to the first frustum ring and the second frustum ring.

7. The maglev power generator as claimed in claim 6, wherein
the radial vibration-proof sets of the two generating modules are symmetrical to each other in an up-down symmetry;
the radial vibration-proof set of each one of the two generating modules is disposed between the electricity generating set and the axial vibration-proof set of the generating modules;
the at least one second radial magnetic unit of the radial vibration-proof set of each one of the two generating modules includes two second radial magnetic units separately arranged along the central axis;
north poles of the second centric magnets of the two second radial magnetic units are oriented toward opposite directions; and
north poles of the second magnetic rings of the two second radial magnetic units are oriented toward opposite directions.

8. The maglev power generator as claimed in claim 3, wherein the maglev power generator has a magnetic lifting set mounted within the frame and having
a board being stationary and having
a tapered hole extending along the central axis, tapered off from the top down, and having
a first tapered section; and
a second tapered section disposed below the first tapered section; and
a first frustum ring disposed within the first tapered section; and
a second frustum ring disposed within the second tapered section; and
an axial magnet fixed to the transmitting shaft, surrounded by the first frustum and the second frustum, and having
a first portion being a frustum; and
a second portion being a frustum that is symmetrical to the first portion in an up-down symmetry, being able to be fit in the first frustum ring and the second frustum ring, and being repellent to the first frustum ring and the second frustum ring.

9. The maglev power generator as claimed in claim 2, wherein the maglev power generator has a motor disposed between the two generating modules and having
a rotor fixed to the transmitting shaft;
a winding securely mounted in the frame via a carrying board and mounted around the rotor; and
an annular air gap is disposed between the rotor and the winding.

10. The maglev power generator as claimed in claim 9, wherein
the radial vibration-proof sets of the two generating modules are symmetrical to each other in an up-down symmetry;
the radial vibration-proof set of each one of the two generating modules is disposed between the electricity generating set and the axial vibration-proof set of the generating module;
the at least one second radial magnetic unit of the radial vibration-proof set of each one of the two generating modules includes two second radial magnetic units separately arranged along the central axis;
north poles of the second centric magnets of the two second radial magnetic units are oriented toward opposite directions; and
north poles of the second magnetic rings of the two second radial magnetic units are oriented toward opposite directions.

11. The maglev power generator as claimed in claim 9, wherein the maglev power generator has a magnetic lifting set mounted within the frame and having
a board being stationary and having
a tapered hole extending along the central axis, tapered off from the top down, and having
a first tapered section; and
a second tapered section disposed below the first tapered section; and
a first frustum ring disposed within the first tapered section; and
a second frustum ring disposed within the second tapered section; and
an axial magnet fixed to the transmitting shaft, surrounded by the first frustum and the second frustum, and having
a first portion being a frustum; and
a second portion being a frustum that is symmetrical to the first portion in an up-down symmetry, being able to be fit in the first frustum ring and the second frustum ring, and being repellent to the first frustum ring and the second frustum ring.

12. The maglev power generator as claimed in claim 11, wherein
the radial vibration-proof sets of the two generating modules are symmetrical to each other in an up-down symmetry;

the radial vibration-proof set of each one of the two generating modules is disposed between the electricity generating set and the axial vibration-proof set of the generating modules;

the at least one second radial magnetic unit of the radial vibration-proof set of each one of the two generating modules includes two second radial magnetic units separately arranged along the central axis;

north poles of the second centric magnets of the two second radial magnetic units are oriented toward opposite directions; and north poles of the second magnetic rings of the two second radial magnetic units are oriented toward opposite directions.

13. The maglev power generator as claimed in claim 12, wherein
the maglev power generator further has a supplementary radial vibration-proof set mounted in the upper section and being identical to the radial vibration-proof set that is disposed in the lower section;
the magnetic lifting set is mounted in the upper section and disposed between the supplementary radial vibration-proof set and the radial vibration-proof set that is disposed in the upper section.

14. The maglev power generator as claimed in claim 2, wherein the maglev power generator has a magnetic lifting set mounted within the frame and having
a board being stationary and having
a tapered hole extending along the central axis, tapered off from the top down, and having
a first tapered section; and
a second tapered section disposed below the first tapered section; and
a first frustum ring disposed within the first tapered section; and
a second frustum ring disposed within the second tapered section; and
an axial magnet fixed to the transmitting shaft, surrounded by the first frustum and the second frustum, and having
a first portion being a frustum; and
a second portion being a frustum that is symmetrical to the first portion in an up-down symmetry, being able to be fit in the first frustum ring and the second frustum ring, and being repellent to the first frustum ring and the second frustum ring.

15. The maglev power generator as claimed in claim 1, wherein the maglev power generator has a motor disposed between the two generating modules and having
a rotor fixed to the transmitting shaft;
a winding securely mounted in the frame via a carrying board and mounted around the rotor; and
an annular air gap defined between the rotor and the winding.

16. The maglev power generator as claimed in claim 15, wherein
the radial vibration-proof sets of the two generating modules are symmetrical to each other in an up-down symmetry;
the radial vibration-proof set of each one of the two generating modules is disposed between the electricity generating set and the axial vibration-proof set of the generating module;
the at least one second radial magnetic unit of the radial vibration-proof set of each one of the two generating modules includes two second radial magnetic units separately arranged along the central axis;
north poles of the second centric magnets of the two second radial magnetic units are oriented toward opposite directions; and
north poles of the second magnetic rings of the two second radial magnetic units are oriented toward opposite directions.

17. The maglev power generator as claimed in claim 15, wherein the maglev power generator has a magnetic lifting set mounted within the frame and having
a board being stationary and having
a tapered hole extending along the central axis, tapered off from the top down, and having
a first tapered section; and
a second tapered section disposed below the first tapered section; and
a first frustum ring disposed within the first tapered section; and
a second frustum ring disposed within the second tapered section; and
an axial magnet fixed to the transmitting shaft, surrounded by the first frustum and the second frustum, and having
a first portion being a frustum; and
a second portion being a frustum that is symmetrical to the first portion in an up-down symmetry, being able to be fit in the first frustum ring and the second frustum ring, and being repellent to the first frustum ring and the second frustum ring.

18. The maglev power generator as claimed in claim 17, wherein the radial vibration-proof sets of the two generating modules are symmetrical to each other in an up-down symmetry;
the radial vibration-proof set of each one of the two generating modules is disposed between the electricity generating set and the axial vibration-proof set of the generating module;
the at least one second radial magnetic unit of the radial vibration-proof set of each one of the two generating modules includes two second radial magnetic units separately arranged along the central axis;
north poles of the second centric magnets of the two second radial magnetic units are oriented toward opposite directions; and
north poles of the second magnetic rings of the two second radial magnetic units are oriented toward opposite directions.

19. The maglev power generator as claimed in claim 1, wherein the maglev power generator has a magnetic lifting set mounted within the frame and having
a board being stationary and having
a tapered hole extending along the central axis, tapered off from the top down, and having
a first tapered section; and
a second tapered section disposed below the first tapered section; and
a first frustum ring disposed within the first tapered section; and
a second frustum ring disposed within the second tapered section; and
an axial magnet fixed to the transmitting shaft, surrounded by the first frustum and the second frustum, and having
a first portion being a frustum; and
a second portion 822 being a frustum that is symmetrical to the first portion in an up-down symmetry, being able to be fit in the first frustum ring and the second frustum ring, and being repellent to the first frustum ring and the second frustum ring.

20. The maglev power generator as claimed in claim 18, wherein
- the maglev power generator further has a supplementary radial vibration-proof set mounted in the upper section and being identical to the radial vibration-proof set that is disposed in the lower section;
- the magnetic lifting set is mounted in the upper section and disposed between the supplementary radial vibration-proof set and the radial vibration-proof set that is disposed in the upper section.

* * * * *